March 29, 1927.  1,623,022
H. M. STURGEON
MOLDING PRESS APPARATUS
Filed Feb. 18, 1926   3 Sheets-Sheet 1
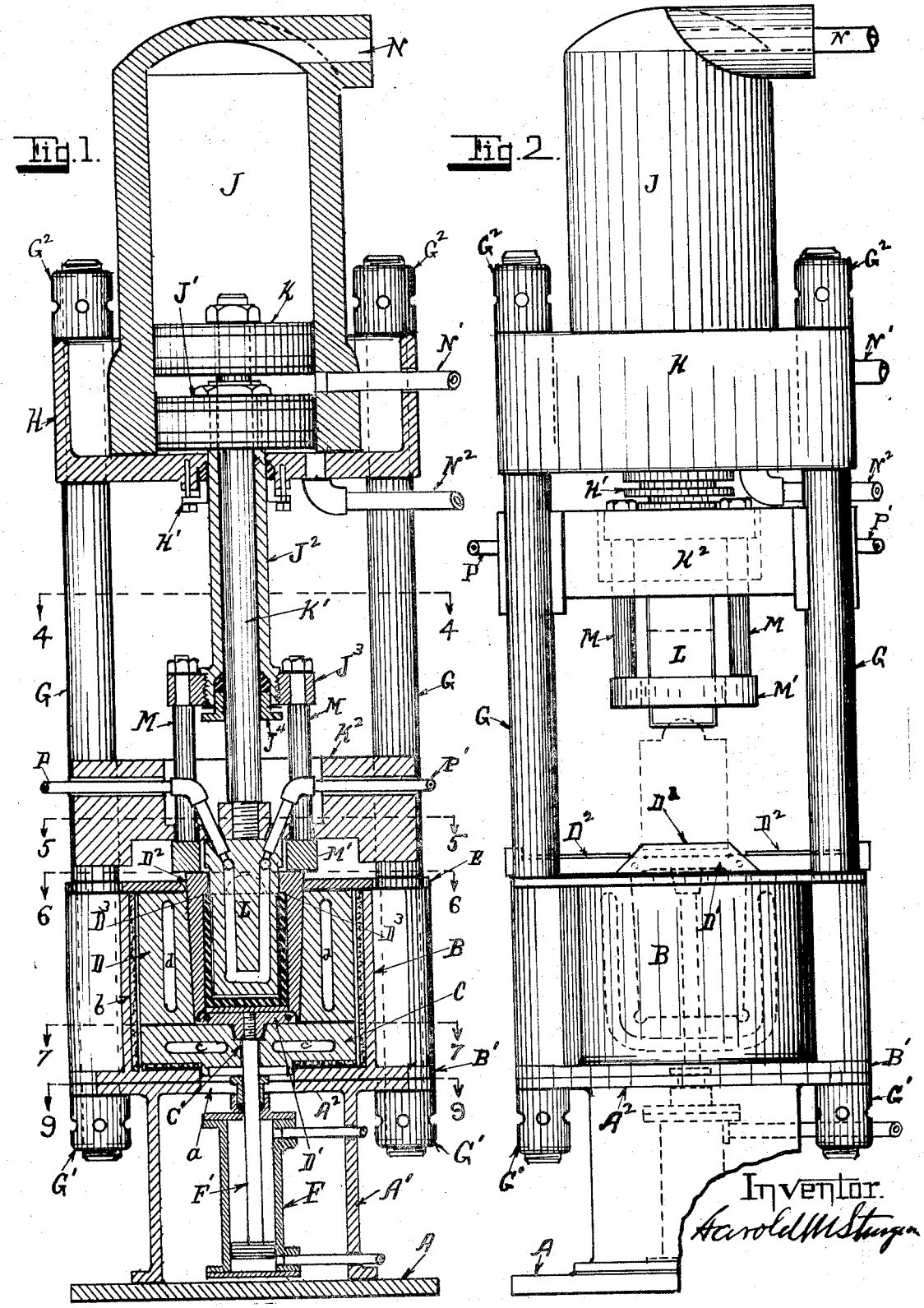
Inventor.
Harold M Sturgeon March 29, 1927.   H. M. STURGEON   1,623,022
MOLDING PRESS APPARATUS
Filed Feb. 18, 1926    3 Sheets-Sheet 2
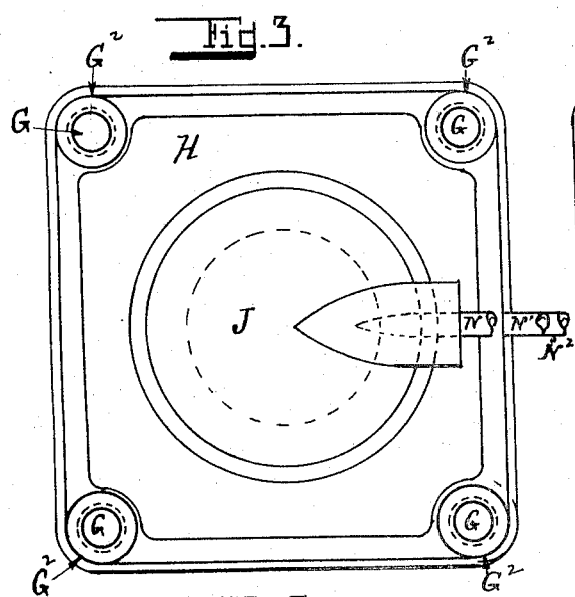
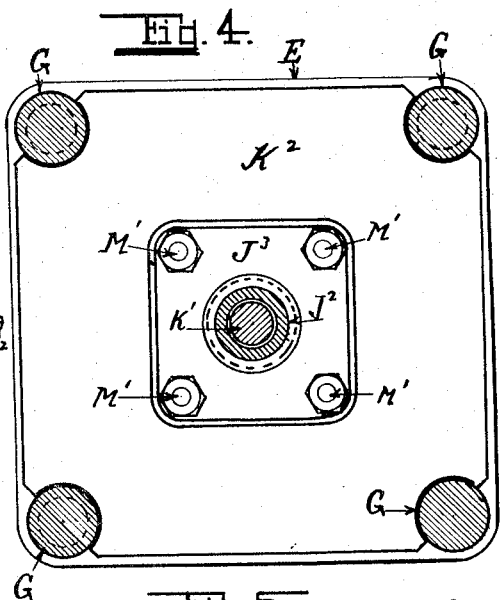
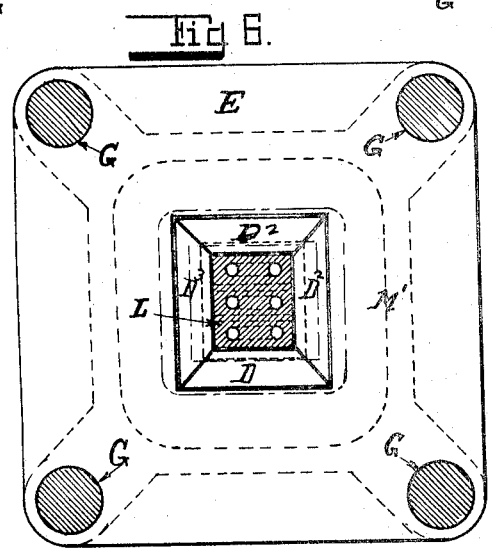
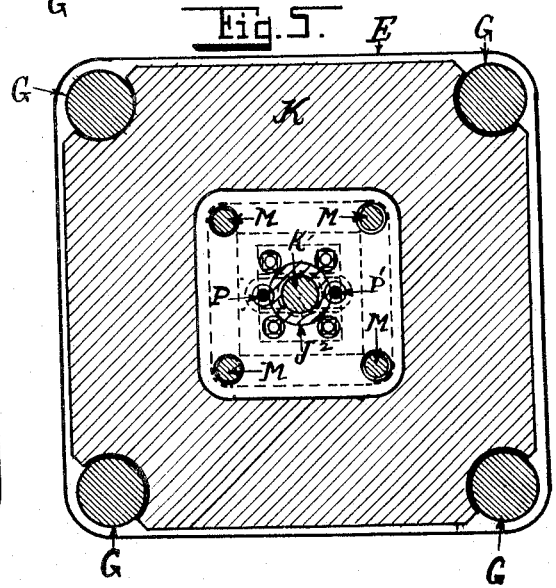
Inventor.
Harold M Sturgeon.

March 29, 1927. 1,623,022
H. M. STURGEON
MOLDING PRESS APPARATUS
Filed Feb. 18, 1926  3 Sheets-Sheet 3
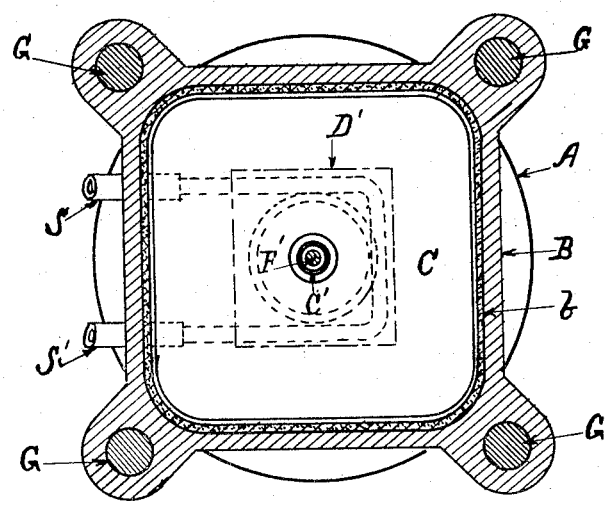
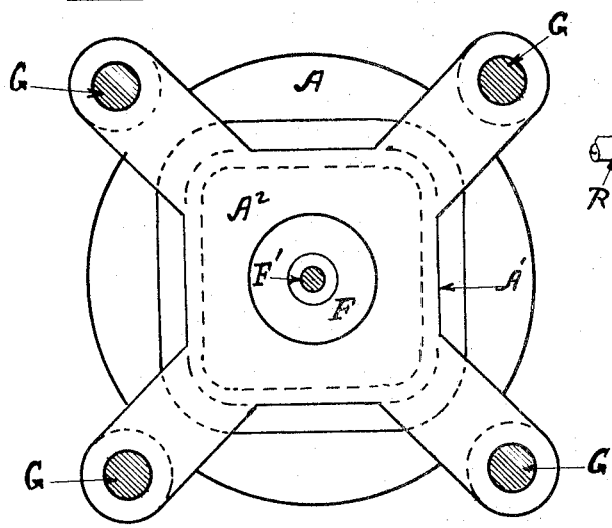
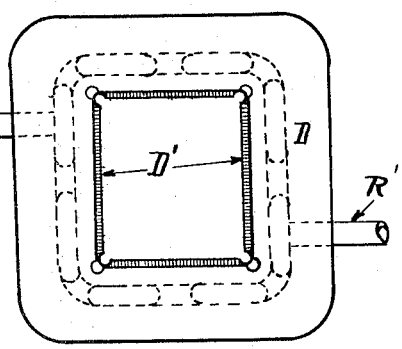
Inventor
Harold M Sturgeon.

Patented Mar. 29, 1927.

1,623,022

UNITED STATES PATENT OFFICE.

HAROLD M. STURGEON, OF ERIE, PENNSYLVANIA, ASSIGNOR OF ONE-HALF TO LOUIS W. HOTTEL, OF ERIE, PENNSYLVANIA.

MOLDING-PRESS APPARATUS.

Application filed February 18, 1926. Serial No. 89,100.

This invention relates to rubber molding apparatus.

The object of this invention is to provide suitable press and mold mechanism adapted to receive a suitable mass of rubber or other compound and by applying pressure to said mass of compound, causing the compound to fill the mold cavity, and be maintained under pressure during the required period.

To provide in such an apparatus suitable guides so that the vertically movable parts will be guided properly when entering the mold-box so as to ensure the side walls of the molded article being of uniform thickness.

To so construct the apparatus that when heat is used heated portions thereof, in their expansion and contraction, will not effect the frame of the apparatus and cause the same to become out of alignment.

In carrying out the objects of this invention, a mold case is provided having a mold-plate receiving recess therethrough, and is also provided with cavities by means of which the temperature of the mold case can be regulated. This mold-case stands on a base plate which is also provided with cavities by means of which its temperature can be regulated, so that the temperature of the side and bottom surfaces of the mold-plate receiving recess can be regulated as desired. Within the mold-plate receiving recess, a set of separable mold side plates, articulated upon a bottom mold-plate is placed.

In the base of the apparatus is placed a cylinder and piston mechanism, adapted to be operated by fluid, and the piston rod of this mechnism is secured to the bottom mold-plate in the mold-plate receiving recess in the mold-case, and can thereby be forced upwardly out of said recess, and then drawn downwardly into place within said recess. A press head-plate is provided, upon which is secured a cylinder in which are placed two pistons, one above the other, with a piston rod connected to one of said pistons and a core-mold secured to the lower end of said piston-rod, while another piston-rod is connected to the other piston, and has secured to the lower end thereof means to engage the upper ends of said mold-plates by which means the mold-plates can be pressed downwardly, while the core-mold is being pulled upwardly.

These and other features of this invention are hereinafter fully described and pointed out, and are illustrated in the accompanying drawings, in which:

Figure 1 is a vertical central section of a rubber molding apparatus constructed according to this invention.

Figure 2 is a side elevation of the same.

Figure 3 is a plan view thereof.

Figure 4 is a horizontal section of the same on the line 4—4 in Fig. 1.

Figure 5 is a like section on the line 5—5 in Fig. 1.

Figure 6 is a like section on the line 6—6 in Fig. 1.

Figure 7 is a like section on the line 7—7 in Fig. 1.

Figure 8 is a plan view of the mold-case removed from the apparatus.

Figure 9 is a transverse section of this rubber molding apparatus on the line 9—9 in Fig. 1.

In these drawings A indicates the base plate of the apparatus, and A' indicates the base frame thereof which has a top plate $A^2$ having a central opening, $a$, therethrough. Mounted upon the top plate $A^2$ is the main frame B of the apparatus having a bottom plate B' which engages the top-plate $A^2$ of the base frame A', and is provided with a central opening therethrough which coincides with the opening $a$ in the top plate $A^2$. Within the main frame B upon the bottom B' thereof is placed the bottom plate C of the mold-case. This bottom plate C is provided with a central opening C', therethrough, and with steam or water receiving cavities $c$ in the body thereof. Upon the bottom plate C within the frame B is placed a mold case D, see Fig. 8, having a mold-plate receiving recess D' therethrough, and is provided with steam or water receiving cavities $d$ by means of which the temperature of the same may be regulated. Upon the frame B when heat is to be used is placed a plate E having an opening therethrough which coincides with the mold plate receiving recess D in the mold-case D, and otherwise covers the mold-case D and frame B.

The interior of the main frame B is preferably lined with asbestos or other heat resisting material b to insulate the metal of the main frame B from heat radiated from the heated mold-case D and mold case bottom plate C, so that the main frame B will not be subject to expansion or contraction.

Upon the base plate A and within the base frame is placed a cylinder and piston mechanism F of ordinary construction, from which a piston rod F' extends upwardly through the opening C' in the plate C into the mold plate receiving recess where a bottom mold plate D' is secured thereto, and articulated upon the perimeter of the bottom mold plate D', are side mold plates $D^2$, which are provided adjacent to the upper ends on their inner surfaces with inwardly extending shoulders $D^3$ which are equal to the thickness of the wall of the container to be molded. G indicates the four strain rods of the apparatus, which extend upwardly through the plates $A^2$ and B', and the corners of the frame B, and cover plate E with radial shoulders on said rods G bearing upon the cover plate E, and nuts G' on the lower ends of said strain rods whereby the plate $A^2$, frame B and cover plate E are securely bound and clamped together.

Upon the upper ends of the strain rods G is placed the head plate H of the press, which is securely held in place by the nuts $G^2$ placed upon said strain rods in the usual manner. In the central portion of the head plate H is an opening therethrough, which is provided with stuffing box mechanism H' of usual construction. Upon the head plate H is secured a cylinder J in the lower end of which is a piston J' to which a hollow piston rod $J^2$ is secured which extends downwardly therefrom through the stuffing box mechanism H'. Above the piston J' there is another piston K, from which a piston rod K' extends downwardly through the hollow piston rod $J^2$, and upon the lower end of the piston rod K' is secured a cross-head $K^2$, the corners of which engage and are guided by the vertical strain rods G as shown in Fig. 5.

Secured to the under side of the cross head $K^2$ is a core-mold L the body of which is adapted to enter between and bear against the upper ends of the side mold plates $D^2$, so that the space between said core-mold L and said plates below the inward shoulders $D^3$ adjacent to the upper ends of said plates will form the mold cavity to be filled with rubber compound.

The hollow piston-rod $J^2$ is provided at its lower end with a cross-head $J^3$ and with a stuffing box mechanism $J^4$ of ordinary construction so that fluid will not escape from the lower end of said hollow piston rod. The cross-head $J^3$ is provided with downwardly extending rods M which extend downwardly therefrom through openings in the cross-head $K^2$, and have secured on the lower ends thereof, under said cross-head, a frame M' adapted to engage the upper ends of the mold-plates $D^2$. The pistons J' and K are arranged within the cylinder J in spaced relation to each other so that fluid under pressure can be introduced between them whereby the piston K will be forced upward, while the piston J' will be forced downwardly whereby the mold plates $D^2$ will be held firmly in place in the mold case, while the core-mold L and cross-head $K^2$ are being lifted upward. The cylinder J is provided with a fluid supply opening N through which fluid is introduced to move the pistons K and J' downward to lower the frame M' upon the upper ends of the mold plates D and the core mold into the mold.

The cylinder J is also provided with a fluid inlet N' whereby fluid can be introduced between the pistons J' and K, and with a fluid inlet pipe $N^2$ whereby fluid can be introduced into the cylinder J under the piston J' whereby the frame M' can be raised from the mold plates after the core mold is free from the molded article. P and P' indicate inlet and outlet pipes for heating or cooling the core mold L, while R and R' indicate inlet and outlet pipes for heating or cooling the mold case D, and S and S' indicate inlet and outlet pipes for heating or cooling the mold case bottom plate, and T and T' indicate fluid supply pipes for operating the cylinder F.

In operation, the cylinder F in the base of the machine is operated to draw the mold plates $D^2$ from the position shown in Fig. 2 into the receiving recess D' as shown in Fig. 1, and the pistons are lowered to the position shown in Fig. 1 so that the core mold L is within the mold plates. Steam may be then turned into all of the steam cavities until the core mold L and mold case D and bottom plate C, and mold plates $D^2$ become sufficiently heated, when the pistons J' and K are operated to raise the mold core L out of the mold, which will also lift the frame M from the upper ends of the mold plates, so that the upper end of the mold is open, into which the proper amount of rubber compound can be placed. The pistons J' and K are operated to lower the core-mold L into the mold and the frame M upon the upper ends of the mold plates $D^2$. The piston K will force the core mold L into the mold until the cross-head $K^2$ rests upon the frame M. The cross head $K^2$ can be made as heavy as desired, so that entire dependence will not be placed upon the cylinder J and piston K for the required pressure necessary to mold the desired article.

Having thus fully shown and described the construction and operation of this invention so that others can utilize the same, I do not desire to limit myself to the exact construction and arrangement shown and described, as many modifications can be made therein without departing from the scope of my invention, therefore what I claim as new and desire to secure by Letters Patent is:

1. In a molding press for containers, a mold case, mold-box plates in said case, means to impart vertical movement to said mold-box plates with relation to said mold case, fluid actuated mechanism to press down upon the upper edges of said mold-box plates, a core-mold, and fluid actuated mechanism adapted to force said core-mold into said mold-box and withdraw it therefrom in opposition to the first mentioned fluid actuated mechanism.

2. In a molding press for containers, a mold case, mold-box plates in said case, means to impart vertical movement to said mold-box plates with relation to said mold-case, a core-mold adapted to enter said mold-box and to engage and be guided thereby, fluid actuated mechanism adapted to impart vertical movement to said core-mold with relation to said mold-box plates, and fluid actuated mechanism engaging said mold-box plates adapted to maintain them stationary in opposition to said core-mold.

3. In a molding press for containers, a mold-case, mold box plates in said case, fluid actuated mechanism to elevate said plates with relation to said mold-case, a core-mold, means to press down upon the upper edges of said mold-box plates in said mold case in opposition to the upward movement of said core-mold, and means to impart vertical movement to said core-mold with relation to said mold-box plates.

4. In a molding press for containers, a main press frame, a mold-case within said frame having a mold-box receiving recess therein, a plate on said frame to secure said mold-case in said main press frame, mold-box plates in said mold-box case, strain rods secured in the corners of said main press frame and extending upwardly therefrom, a press head plate secured on the upper ends of said strain rods, a fluid cylinder on said head plate, a lower piston in said cylinder, a piston rod extending downwardly therefrom, means on the lower end of said piston rod to engage said mold-box plates, another piston in said cylinder, a piston rod extending downwardly therefrom, a core mold supported on said piston rod and adapted to extend into said mold-box, and a cross-head on said last mentioned piston rod and engaging and guided by said strain rods.

5. In a molding press, a main frame, a mold case contained within said main frame having a mold receiving and supporting recess therethrough, a separable mold-box comprising bottom and side plates adapted to be supported by said mold-case, vertical strain rods secured in the corners of said main press frame, a cross-head plate slidably mounted between said strain rods and guided thereby, a core-mold adapted to enter said mold box and form the interior of the mold cavity secured to the under side of said cross-head, a fluid cylinder supported upon said strain rods, a piston therein, a piston rod extending downward to and secured to said cross-head, another piston in said cylinder, another piston rod extending downwardly therefrom, a cross-head on said second mentioned piston rod, rods secured to said cross-head and extending downwardly through the first mentioned cross-head, a frame between said first mentioned cross-head and the upper ends of said mold-box plates, said frame being secured to said last mentioned rods, whereby when fluid is forced between the pistons in said fluid cylinder, the force exerted under the upper piston is also exerted upon the lower piston whereby the mold-box plates are held down while the core-mold is pulled upwardly.

6. In a hot molding press, a hot mold case, a mold-box therein adapted to be heated therefrom, a main press frame having an interior space to receive said hot mold case, and insulated therefrom, strain rods secured in the corners of said main press frame, a cold press head plate, a hydraulic cylinder on said head plate, a hot core-mold and piston rod mechanism operated by said cylinder to operate said hot core-mold, and a cold cross-head mounted between said strain rods and guided thereby, secured to and operated by said piston rod mechanism.

7. In a molding press for containers, mold-box plates, a mold box case to receive and support said plates, a core-mold to enter said mold-box and thereby complete the mold, pressure mechanism to move said core-mold into said mold-box and remove it therefrom, and pressure mechanism to press downward on said plates during the removal of said core-mold and to release said pressure after the core-mold is removed from said mold-box.

In testimony whereof I affix my signature.

HAROLD M. STURGEON.